United States Patent
Burström et al.

(10) Patent No.: US 12,199,321 B2
(45) Date of Patent: Jan. 14, 2025

(54) SYSTEM AND METHOD FOR GENERATING ELECTRIC POWER WITH A FUEL CELL ARRAY, CONTROL UNIT AND DYNAMIC ELECTRICAL LOAD

(71) Applicant: FUEL CELL TECHNOLOGY SWEDEN AB, Upplands Väsby (SE)

(72) Inventors: Stefan Burström, Stockholm (SE); Michael Glantz, Åhus (SE)

(73) Assignee: FUEL CELL TECHNOLOGY SWEDEN AB, Upplands Väsby (SE)

( * ) Notice: Subject to any disclaimer, the term of this patent is extended or adjusted under 35 U.S.C. 154(b) by 786 days.

(21) Appl. No.: 16/758,522

(22) PCT Filed: Oct. 23, 2018

(86) PCT No.: PCT/SE2018/051082
§ 371 (c)(1),
(2) Date: Apr. 23, 2020

(87) PCT Pub. No.: WO2019/083435
PCT Pub. Date: May 2, 2019

(65) Prior Publication Data
US 2020/0266461 A1 Aug. 20, 2020

(30) Foreign Application Priority Data
Oct. 26, 2017 (SE) .................................. 1751326-8

(51) Int. Cl.
*H01M 8/04089* (2016.01)
*B60L 50/40* (2019.01)
(Continued)

(52) U.S. Cl.
CPC ......... *H01M 8/04089* (2013.01); *B60L 50/40* (2019.02); *B60L 50/66* (2019.02);
(Continued)

(58) Field of Classification Search
None
See application file for complete search history.

(56) References Cited

U.S. PATENT DOCUMENTS 6,428,917 B1 8/2002 Lacy et al.
6,455,181 B1 9/2002 Hallum
(Continued)

FOREIGN PATENT DOCUMENTS

GB 2459375 10/2009

*Primary Examiner* — Lucas J. O'Donnell
(74) *Attorney, Agent, or Firm* — DUANE MORRIS LLP; Gregory M. Lefkowitz; Randall C. Pyles

(57) ABSTRACT

Electric power is produced in a fuel cell array based on chemical fuel provided from a fuel source. The electric power is held available via an output terminal. A sensor cell registers a sensor signal reflecting a degree of consumption of chemical fuel in the fuel cell array relative to an amount of chemical fuel received in the fuel cell array. The production of electric power in the fuel cell array is monitored by measuring at least one voltage in the fuel cell array. A fraction of the electric power produced by the fuel cell array is controlled to be fed into a dynamic electric load connected to the output terminal. The fraction fed into the dynamic electric load is controlled in response to the sensor signal such that a difference is minimized between the amount of chemical fuel received in the fuel cell array and an amount of chemical fuel consumed in the fuel cell array when producing the electric power.

20 Claims, 2 Drawing Sheets

(51) Int. Cl.
B60L 50/60 (2019.01)
B60L 50/71 (2019.01)
B60L 50/75 (2019.01)
H01M 8/04082 (2016.01)
H01M 8/0432 (2016.01)
H01M 8/0438 (2016.01)
H01M 8/0444 (2016.01)
H01M 8/04537 (2016.01)
H01M 8/04746 (2016.01)
H01M 16/00 (2006.01)

(52) U.S. Cl.
CPC ............... *B60L 50/71* (2019.02); *B60L 50/75* (2019.02); *H01M 8/04201* (2013.01); *H01M 8/0432* (2013.01); *H01M 8/0438* (2013.01); *H01M 8/0444* (2013.01); *H01M 8/04559* (2013.01); *H01M 8/04753* (2013.01); *H01M 16/006* (2013.01)

(56) References Cited

U.S. PATENT DOCUMENTS

| | | |
|---|---|---|
| 2001/0014414 A1* | 8/2001 | Okamoto .......... H01M 8/04738 429/415 |
| 2002/0136939 A1 | 9/2002 | Grieve et al. |
| 2003/0022037 A1* | 1/2003 | Parr .................... H01M 8/2457 429/429 |
| 2009/0197129 A1 | 8/2009 | Shimoi et al. |
| 2010/0248053 A1 | 9/2010 | Umayahara et al. |
| 2011/0151345 A1 | 6/2011 | Lundblad et al. |
| 2015/0050528 A1 | 2/2015 | Fujii et al. |

* cited by examiner

SYSTEM AND METHOD FOR GENERATING ELECTRIC POWER WITH A FUEL CELL ARRAY, CONTROL UNIT AND DYNAMIC ELECTRICAL LOAD

CROSS-REFERENCE TO RELATED APPLICATIONS

This application is a § 371 national stage entry of International Application No. PCT/SE2018/051082, filed Oct. 23, 2018, which claims priority of Sweden National Application No. 1751326-8 (, filed Oct. 26, 2017, the entire contents of which are incorporated herein by reference.

TECHNICAL FIELD

The present invention relates generally to production of electric power based on fuel cells. More particularly the invention relates to a system according to the preamble of claim 1 and a corresponding method. The invention also relates to a computer program and a non-volatile data carrier.

BACKGROUND

WO 2010/062251 relates to a power source for portable electronic devices. Here, the design comprises a control unit responsive to changes in fuel cell performance and adapted to momentarily stop or decrease the fuel cell current for a period of time in case of a malfunction. There is also provided a pressure release valve at the exit of the fuel cell unit. This valve is adapted to open in response to an increased pressure inside the fuel cell unit. A flow restrictor is coupled between the fuel source and the fuel cell unit. The flow restrictor is adapted to provide a pressure within the fuel cell unit during normal operation that is lower than the opening pressure for the valve.

This design provides a desirable flexibility with respect to any variations in fuel cell performance. However, there is still room for improvements of the overall efficiency in the process of converting chemical energy into electrical energy.

SUMMARY

One object of the present invention is therefore to offer a highly efficient energy-conversion solution.

Another object of the invention is to provide an uncomplicated and safe solution for producing electric power, wherein the risk is minimized that unconsumed hydrogen escapes into the surroundings.

According to one aspect of the invention, these objects are achieved by the initially described control system, wherein the system contains a dynamic electric load, which is connected to the output terminal. The control unit is configured to receive the sensor signal, and in response thereto control a fraction of the electric power produced by the fuel cell array to be fed into the dynamic electric load. The fraction fed into the dynamic electric load is that a difference is minimized between the amount of chemical fuel received in the fuel cell array and an amount of chemical fuel consumed in the fuel cell array when producing the electric power.

This system is advantageous since it handles a temporary surplus of fuel in a straightforward and reliable manner. Additionally, no unused fuel needs to be released into the surroundings during the process.

According to one embodiment of this aspect of the invention, the system includes a controllable valve, which is arranged to influence the amount of chemical fuel received in the fuel cell array. The control unit is further configured to control the controllable valve in response to the sensor signal. Thereby, the overall input of fuel into the fuel cell array can be set to an appropriate level. Naturally, this reduces the demand on the dynamic electric load.

According to another embodiment of this aspect of the invention, the fuel source contains a fuel tank and a chemical reactor. The fuel tank is configured to hold at least one source substance, for instance sodium hydroxide and water, for a chemical reaction through which the chemical reactor is configured to produce the chemical fuel, e.g. hydrogen. The above-mentioned controllable valve is here arranged in a passage way for the at least one source substance between the fuel tank and the chemical reactor. Thus, the controllable valve may conveniently control the amount of fuel being generated and forwarded into the fuel cell array.

According to yet another embodiment of this aspect of the invention, a pressure sensor is arranged to produce a pressure signal reflecting a pressure level in the chemical reactor. Here, the control unit is configured to control the controllable valve in further response to the pressure signal. Alternatively, or in addition thereto, a temperature sensor may be arranged to produce a temperature signal reflecting a temperature in the chemical reactor; and the control unit is configured to control the controllable valve in further response to the temperature signal. Thereby, on the further basis of the pressure and/or temperature level, the process can be controlled towards a desired intensity.

According to a further embodiment of this aspect of the invention, the dynamic electric load contains a chargeable battery and/or a supercapacitor. This is advantageous, especially in comparison to a resistive load, since such a dynamic electric load enables efficient storage of any excessive electrical energy generated for later use.

According to another embodiment of this aspect of the invention, the at least one voltage measured by the control unit includes a respective individual voltage over each fuel cell of a number of fuel cells in the fuel cell array. The control unit is here specifically configured to decrease the fraction fed into the dynamic electric load if at least one of said respective individual voltages is below a first threshold voltage. Alternatively, or in addition thereto, the at least one voltage measured by the control unit contains an output voltage at the output terminal. In such a case, the control unit is configured to decrease the fraction fed into the dynamic electric load if the output voltage is below a second threshold voltage. Hence, if, for some reason, a voltage drop occurs, the amount of energy fed into the dynamic electric load will be reduced. This, in turn, enables balancing the output voltage to a relatively stable value.

According to still another embodiment of this aspect of the invention, the control unit is configured to control the fraction of the electric power fed into the dynamic electric load by varying a magnitude of a current flowing into the dynamic electric load. For example, this is a convenient design if the dynamic electric load contains a load that does not require a constant current, such as a Lithium-ion battery. Further preferably therefore, the control unit includes a switched-mode DC-to-DC converter in which a switching frequency and/or a duty cycle is controllable by a voltage from the sensor cell.

According to another aspect of the invention, the above objects are achieved by a method of generating electric power comprising: providing chemical fuel from a fuel source to a fuel cell array; producing electric power in the fuel cell array based on the chemical fuel, the electric power being held available via an output terminal; registering, via a sensor cell, a sensor signal reflecting a degree of consumption of chemical fuel in the fuel cell array relative to an amount of chemical fuel received in the fuel cell array; and monitoring the production of electric power in the fuel cell array by measuring at least one voltage in the fuel cell array. Moreover, a dynamic electric load is connected to the output terminal, and the method comprises: receiving the sensor signal; and in response thereto controlling a fraction of the electric power produced by the fuel cell array to be fed into the dynamic electric load. The fraction fed into the dynamic electric load is here controlled such that a difference is minimized between the amount of chemical fuel received in the fuel cell array and an amount of chemical fuel consumed in the fuel cell array when producing the electric power. The advantages of this method, as well as the preferred embodiments thereof, are apparent from the discussion above with reference to the proposed control system.

According to a further aspect of the invention the above objects are achieved by a computer program loadable into a non-volatile data carrier communicatively connected to a processing unit. The computer program includes software for executing the above method when the program is run on the processing unit.

According to another aspect of the invention the objects are achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
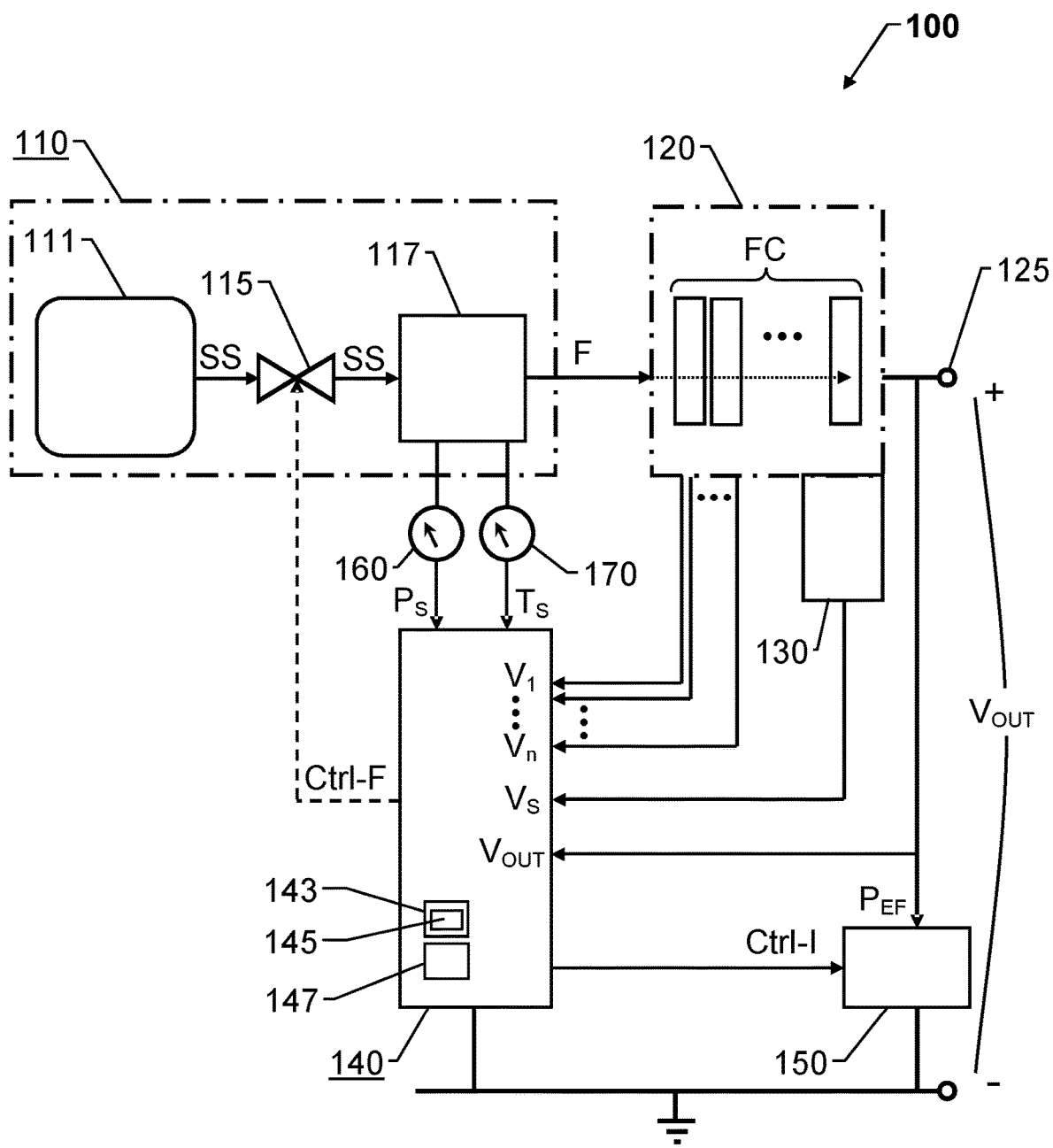
FIG. 1 shows a block diagram over a system according to one embodiment of the invention.

FIG. 1 shows an example of a block diagram over a proposed system. The system contains a fuel source 110, a fuel cell array 120, a sensor cell 130, a control unit 140 and a dynamic electric load 150.

The fuel source 110 is configured to provide chemical fuel F. For example, to this aim, the fuel source 110 may include a fuel tank 111 and a chemical reactor 117. The fuel tank 111 is configured to hold at least one source substance SS for a chemical reaction through which the chemical reactor 117 is configured to produce the chemical fuel F. For instance, the source substances SS may include water ($H_2O$) and sodium hydroxide (NaOH); and based thereon, the chemical reactor 117 may be configured to produce chemical fuel F in the form of hydrogen ($H_2$). Preferably, a controllable valve 115 is arranged in a passage way for the at least one source substance SS between the fuel tank 111 and the chemical reactor 117. Thereby, the amount of source substances SS fed into the chemical reactor 117 can be varied by the control unit 140 via a control signal Ctrl-F.

The fuel cell array 120 is configured to receive the chemical fuel F from the fuel source 110 and based thereon produce electric power that is held available via an output terminal 125. The fuel cell array 120 typically contains a relatively large number of fuel cells FC (say n+1), which are arranged in series in a fuel cell assembly. In operation, a respective voltage $V_1, \ldots, V_n$ arises over each fuel cell.

The sensor cell 130 is positioned at a last fuel cell (here, the (n+1):th cell) in the fuel cell assembly, and is configured to register a sensor signal $V_S$ reflecting a degree of consumption of chemical fuel F in the fuel cell array 120 relative to an amount of chemical fuel F received in the fuel cell array 120. The serial arrangement of the fuel cells FC means that if the chemical fuel F has been fully consumed in the fuel cell assembly, no unconsumed fuel F remains after the last fuel cell, n+1. In other words, in the sensor cell 130, it is a relatively straightforward task to derive the degree of consumption of chemical fuel F in the fuel cell array 120.

The control unit 140 is configured to monitor the production of electric power in the fuel cell array 120 by measuring the respective voltages $V_1, \ldots, V_n$ over the fuel cells FC. The control unit 140 is also configured to measure an output voltage $V_{OUT}$ at the output terminal 125, and based thereon, control the conversion of chemical energy into electric energy as will be described below.

Further, the control unit 140 is configured to receive the sensor signal $V_S$, which may likewise be represented by a voltage. In such a case, the control unit 140 preferably includes a switched-mode DC-converter in which a switching frequency and/or a duty cycle is controllable by the voltage represented by the sensor signal $V_S$ from the sensor cell 130.

In any case, in response to the sensor signal $V_S$, the control unit 140 is configured to control, via a control signal Ctrl-I, a fraction $P_{EF}$ of the electric power produced by the fuel cell array 120 to be fed into the dynamic electric load 150. More precisely, the control unit 140 controls such a fraction $P_{EF}$ to be fed into the dynamic electric load 150 that a difference is minimized between the amount of chemical fuel F received in the fuel cell array 120 and an amount of chemical fuel consumed in the fuel cell array 120 when producing the electric power.

Preferably, the control unit is configured to control Ctrl-I the fraction $P_{EF}$ of the electric power fed into the dynamic electric load 150 by varying a magnitude of a current flowing into the dynamic electric load 150.

It is further advantageous if the dynamic electric load 150 contains a chargeable battery (e.g. of Lithium-ion type) and/or a so-called supercapacitor (i.e. a high-capacity capacitor with a capacitance value considerably higher than other capacitors, which typically can store 10 to 100 times more energy per unit volume or mass than electrolytic capacitors, and which tolerates substantially more charge and discharge cycles than rechargeable batteries). Namely, these types of electric storage units do not require a constant current during the charging process.

Preferably, the control unit 140 is configured to decrease the fraction $P_{EF}$ of the electric power fed into the dynamic electric load 150 if at least one of the respective individual voltages $V_1, \ldots, V_n$ falls below a first threshold voltage, say 350 mV. Hence, the fraction $P_{EF}$ can be held at an adequate level.

Similarly, if the output voltage $V_{OUT}$ falls below a second threshold voltage, say 300 mv, the control unit 140 is preferably configured to decrease the fraction $P_{EF}$ of the electric power fed into the dynamic electric load 150.

According to one embodiment of the invention, the control unit 140 is also configured to control the controllable valve 115, via the control signal Ctrl-F, in response to the sensor signal $V_S$. Thus, the amount of chemical fuel F received in the fuel cell array 120 is influenced so that a sufficient, however not excessive amount of chemical fuel F is fed into the fuel cell array 120.

According to another embodiment of the invention, a pressure sensor 160 is arranged to produce a pressure signal $P_S$ that reflects a pressure level in the chemical reactor 117. The control unit 140 is here configured to control the controllable valve 115 in further response to the pressure signal $P_S$. Thereby, the control unit 140 can regulate the process in the chemical reactor 117 to a desired pressure level. Moreover, in addition to or as an alternative thereto, a temperature sensor 170 may be arranged to produce a temperature signal $T_S$ reflecting a temperature in the chemical reactor 117. This enables the control unit 140 to regulate the process in the chemical reactor 117 to an appropriate temperature level.

It is generally advantageous if the central control unit 140 is configured to implement the above-described procedure in a fully automatic manner, for instance by executing a computer program. Therefore, the control unit 140 is preferably communicatively connected to a memory unit 143 (i.e. non-volatile data carrier) storing a computer program, which, in turn, contains software 145 for making at least one processor 147 in the control unit 140 execute the above-described actions when the computer program is run on the at least one processor 147.

Figure 2:
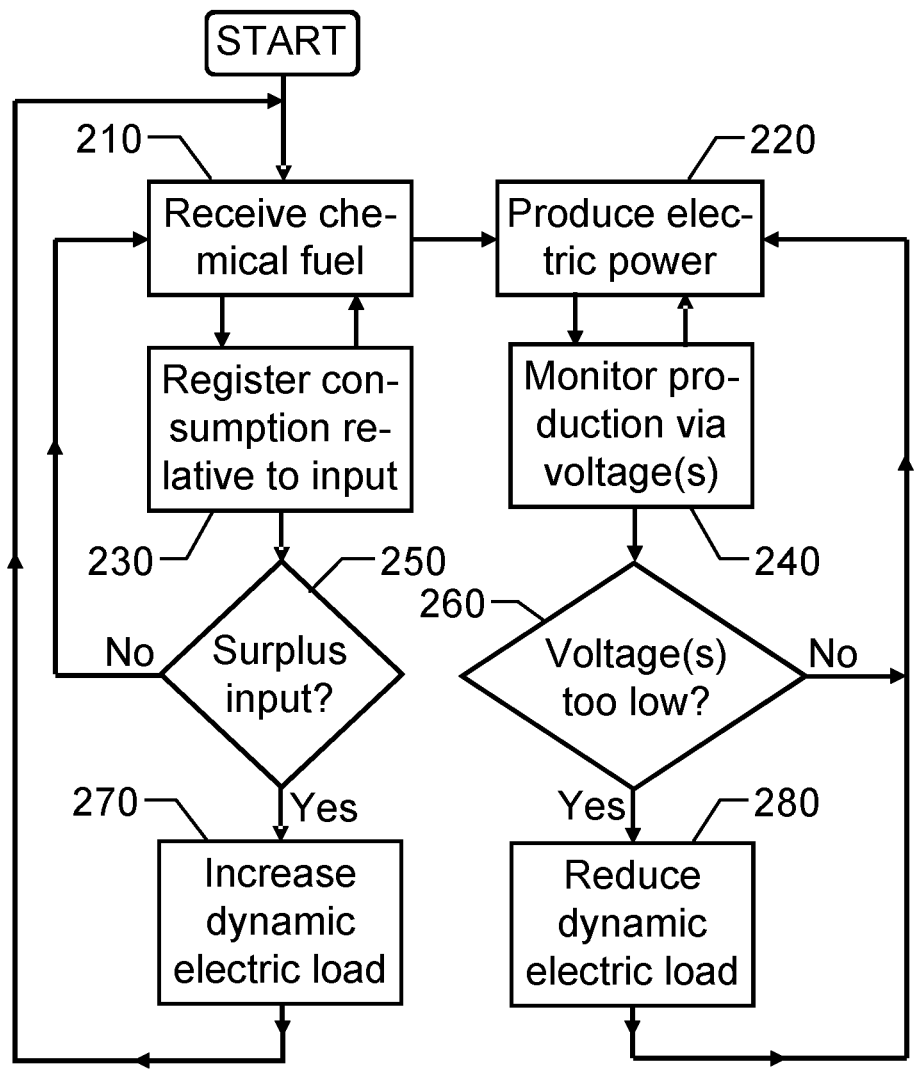
FIG. 2 illustrates, by means of a flow diagram, the general method according to the invention.

In order to sum up, and with reference to the flow diagram in FIG. 2, we will now describe the general method according to the invention for generating electric power based on fuel cells. It is here assumed that the fuel cells are arranged in a fuel cell array.

In a first step 210, the fuel cell array receives chemical fuel, e.g. hydrogen, from a fuel source. In parallel with step 210, a step 220 produces electric power in the fuel cell array based on the chemical fuel. The electric power is held available via an output terminal, and a dynamic electric load is also connected to the output terminal.

While the fuel cell array receives chemical fuel in step 210, a parallel step 230 registers a degree of consumption of the chemical fuel relative to a total amount of chemical fuel received in the fuel cell array. A step 250 after step 230 checks if there is a surplus of chemical fuel in the fuel cell array, i.e. if more fuel is received than what is consumed. If so, a step 270 follows; and otherwise, the procedure loops back to step 210. In step 270, and the dynamic electric load is increased, thus reducing a difference between the amount of chemical fuel received in the fuel cell array and the amount of chemical fuel consumed in the fuel cell array. The degree of consumption of chemical fuel in the fuel cell array relative to an amount of chemical fuel received in the fuel cell array is monitored via a sensor signal, e.g. representing a voltage in a sensor cell of the fuel cell array.

Analogously, during production of electric power in the fuel cell array in step 220; a step 240 monitors this production by measuring at least one voltage in the fuel cell array. A subsequent step 260 checks if the at least one voltage is below at least one threshold. If so, a step 280 follows; and otherwise, the procedure loops back to step 220. In step 280, the dynamic electric load is reduced, thus allowing a larger proportion of the chemical fuel received in the fuel cell array to be fed out through the output terminal.

In summary, the checks made in steps 250 and 260 respectively aim at controlling a fraction of the electric power produced by the fuel cell array to be fed into the dynamic electric load such that the difference is minimized between the amount of chemical fuel received in the fuel cell array and the amount of chemical fuel consumed in the fuel cell array when producing the electric power.

All of the process steps, as well as any sub-sequence of steps, described with reference to FIG. 2 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for generating electric power, the system comprising:
   a fuel source configured to provide chemical fuel,
   a fuel cell array configured to receive the chemical fuel from the fuel source and based thereon produce electric power being held available to a load outside the system via an output terminal,
   a sensor cell positioned at a last fuel cell array and configured to register a sensor signal reflecting a degree of consumption of chemical fuel in the fuel cell array relative to an amount of chemical fuel received in the fuel cell array,
   a control unit configured to monitor the production of electric power in the fuel cell array by measuring at least one voltage in the fuel cell array, and
   a dynamic electric load that is connected to the output terminal and arranged to receive a fraction of the electric power produced by the fuel cell array, wherein the control unit is further configured to:
   receive the sensor signal from the sensor cell, and
   in response to the sensor signal, provide a control signal to the dynamic electric load to control the fraction of the electric power produced by the fuel cell array to be fed into the dynamic electric load, and the fraction of the electric power fed into the dynamic electric load is controlled to minimize a difference between the amount of chemical fuel received in the fuel cell array and an amount of chemical fuel consumed in the fuel cell array when producing the electric power.

2. The system according to claim 1, comprising a controllable valve which is arranged to influence the amount of chemical fuel received in the fuel cell array, and
the control unit is configured to control the controllable valve in response to the sensor signal.

3. The system according to claim 2, wherein the fuel source comprises a fuel tank and a chemical reactor, the fuel tank being configured to hold at least one source substance for a chemical reaction through which the chemical reactor is configured to produce the chemical fuel, the controllable valve being arranged in a passage way for the at least one source substance between the fuel tank and the chemical reactor.

4. The system according to claim 3, comprising a pressure sensor arranged to produce a pressure signal reflecting a pressure level in the chemical reactor, and
the control unit is configured to control the controllable valve in further response to the pressure signal.

5. The system according to claim 3, comprising a temperature sensor arranged to produce a temperature signal reflecting a temperature in the chemical reactor, and
the control unit is configured to control the controllable valve in further response to the temperature signal.

6. The system according to claim 1, wherein the dynamic electric load comprises at least one of a chargeable battery and a supercapacitor.

7. The system according to claim 1, wherein the at least one voltage measured by the control unit comprises:
a respective individual voltage over each fuel cell of a number of fuel cells in the fuel cell array, and the control unit is configured to decrease the fraction fed into the dynamic electric load if at least one of said respective individual voltages is below a first threshold voltage.

8. The system according to claim 1, wherein the at least one voltage measured by the control unit comprises:
an output voltage at the output terminal, and the control unit is configured to decrease the fraction fed into the dynamic electric load if the output voltage is below a second threshold voltage.

9. The system according to claim 1, wherein the control unit is configured to control the fraction of the electric power fed into the dynamic electric load by varying a magnitude of a current flowing into the dynamic electric load.

10. The system according to claim 1, wherein the control unit comprises a switched-mode DC-to-DC converter in which at least one of a switching frequency and a duty cycle is controllable by a voltage represented by the sensor signal from the sensor cell.

11. A method of generating electric power with a system, the method comprising:
providing chemical fuel from a fuel source to a fuel cell array,
producing electric power in the fuel cell array based on the chemical fuel, the electric power being held available to a load outside the system via an output terminal,
registering, via a sensor cell positioned at a last fuel cell in the fuel cell array, a sensor signal reflecting a degree of consumption of chemical fuel in the fuel cell array relative to an amount of chemical fuel received in the fuel cell array, and
monitoring, by a control unit, the production of electric power in the fuel cell array by measuring at least one voltage in the fuel cell array, wherein
a dynamic electric load is connected to the output terminal and arranged to receive a fraction of the electric power produced by the fuel cell array, and
the method further comprises:
receiving the sensor signal from the sensor cell, and in response to the sensor signal, providing a control signal to the dynamic electric load, and
controlling, by the control unit, a fraction of the electric power produced by the fuel cell array to be fed into the dynamic electric load to minimize a difference between the amount of chemical fuel received in the fuel cell array and an amount of chemical fuel consumed in the fuel cell array when producing the electric power.

12. The method according to claim 11, wherein a controllable valve is arranged to influence the amount of chemical fuel received in the fuel cell array, and the method further comprising:
controlling the controllable valve in response to the sensor signal.

13. The method according to claim 12, wherein the fuel source comprises a fuel tank and a chemical reactor, the fuel tank being configured to hold at least one source substance for a chemical reaction through which the chemical reactor is configured to produce the chemical fuel, the controllable valve being arranged in a passage way for the at least one source substance between the fuel tank and the chemical reactor.

14. The method according to claim 13, wherein a pressure sensor is arranged to produce a pressure signal reflecting a pressure level in the chemical reactor, and the method further comprises:
controlling the controllable valve in further response to the pressure signal.

15. The method according to claim 13, wherein
a temperature sensor arranged to produce a temperature signal reflecting a temperature in the chemical reactor, and
the method further comprises: controlling the controllable valve in further response to the temperature signal.

16. The method according to claim 11, wherein
the at least one measured voltage comprises a respective individual voltage over each fuel cell of a number of fuel cells in the fuel cell array, and
the method further comprises: decreasing the fraction fed into the dynamic electric load if at least one of said respective individual voltages is below a first threshold voltage.

17. The system method according to claim 11, wherein
the at least one measured voltage comprises an output voltage at the output terminal, and
the method further comprises: decreasing the fraction fed into the dynamic electric load if the output voltage is below a second threshold voltage.

18. The system method according to claim 11, wherein the fraction of the electric power fed into the dynamic electric load is controlled by varying a magnitude of a current flowing into the dynamic electric load.

19. A computer program loadable into a non-volatile data carrier communicatively connected to a processing unit, the computer program comprising software for executing the method according to claim 11, when the computer program is run on the processing unit.

20. A non-volatile data carrier containing the computer program of claim 19.

\* \* \* \* \*